United States Patent Office 2,767,437
Patented Oct. 23, 1956

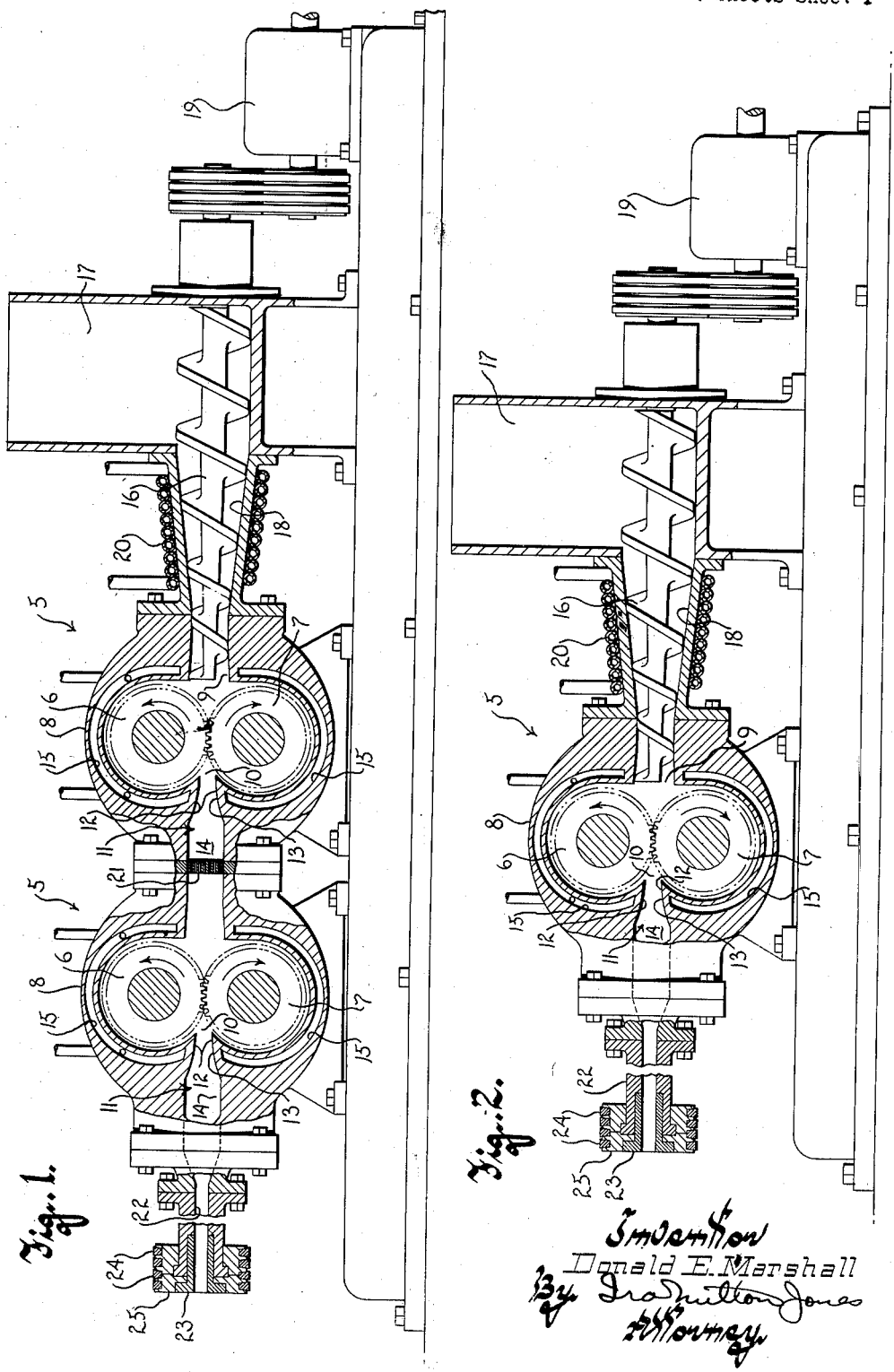

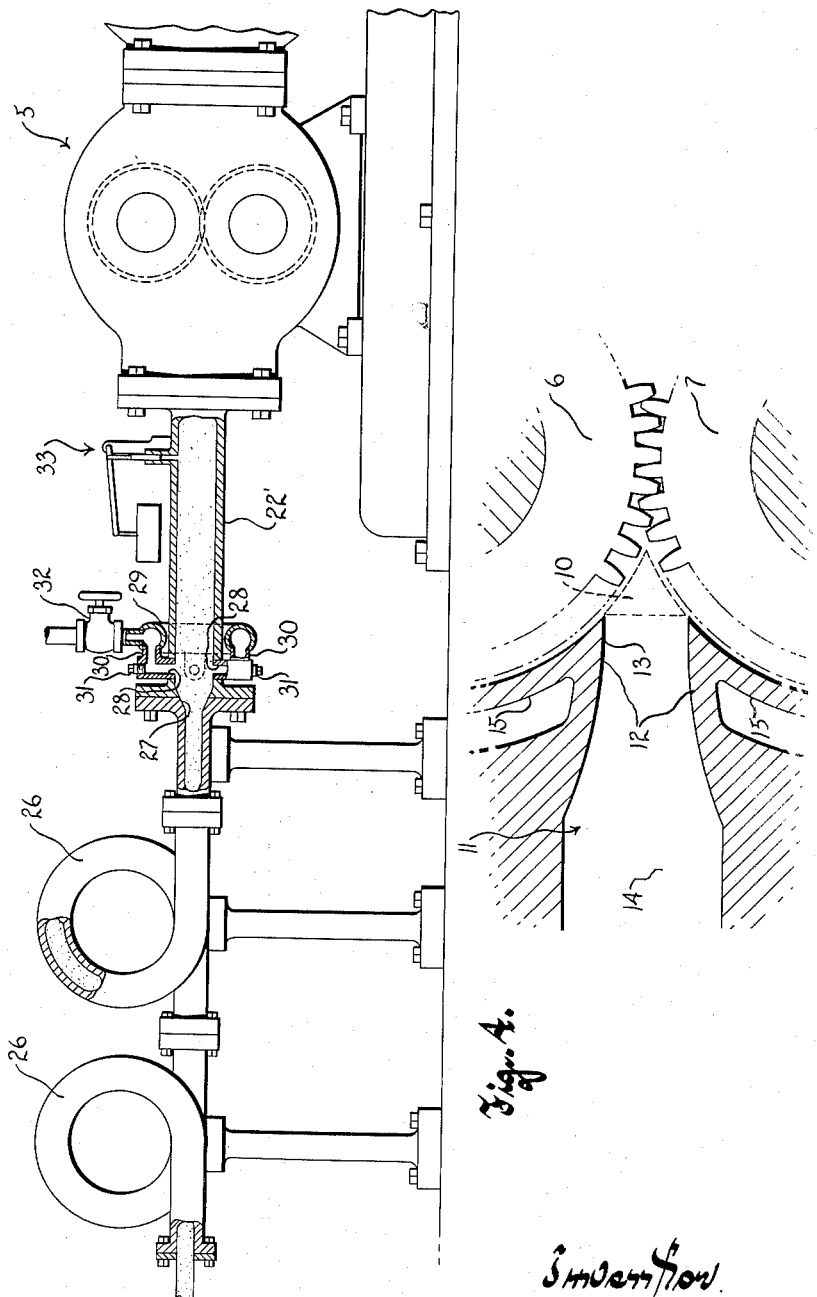

2,767,437

METHOD OF AMALGAMATING AND EXTRUDING SOAP

Donald E. Marshall, Edina, Minn.

Application February 11, 1952, Serial No. 271,059

1 Claim. (Cl. 18—55)

This invention relates to the art of soap making and concerns more particularly the refinement and amalgamation of soap and other detergent mixtures which are in chip or powder form, into extruded bars adapted to be cut into appropriate sized pieces and stamped to form cakes of high grade toilet soap.

The conventional soap extruding machine is of the worm or screw and barrel type, which inherently is an inefficient pumping device utterly incapable of handling high viscosity (hard to deform) chips and powders which are four to fifty times as hard as conventional roller milled and floating soaps.

The amalgamation of such extremely hard soap requires pressure beyond that which can be developed in a worm or screw and barrel type extruder of practical proportions, since, as such high pressures are approached the material being worked begins to revolve in the barrel with the worm and in so doing merely generates heat and produces no useful results. Increasing the length and diameter of the worm or screw makes possible the attainment of higher pressures but to reach the needed pressures the screw would have to have prohibitive proportions, and the temperature rise in the machine would still be more than could be dissipated by cooling coils.

The present invention flows from this knowledge that all previously known ways of amalgamating and extruding soap fail when the material to be handled is as hard as that here contemplated, and has as its purpose to provide a method and apparatus whereby the needed pressure is developed positively and without generating heat beyond an amount which can be successfully and expeditiously dissipated by simple cooling coils or jackets.

Another purpose of this invention is to provide a method and apparatus for thoroughly homogenizing and at the same time mechanically refining the high viscosity chips or powders to be processed into an extruded bar which is perfectly amalgamated and reliably free from incipient cracks which, if they existed, would show up in the finished cake and would very likely be opened by water immersion and drying incident to use.

As is well known to those skilled in modern soap making techniques, the extruded bars are fed directly to the cut-off machine and stamping press in which the pieces cut from the bar are pressed into finished cakes. The rate at which the bar is extruded thus must conform to the speed at which the operator of the stamping press works, which means that the extrusion rate has to be regulatable. The present invention not only provides for such regulation but has as another of its objects to accomplish such regulation by the simple and inexpensive expedient of feeding the chips or powder to a combined extruding and amalgamating machine by a low horsepower feed screw, and driving the screw through a conventional variable speed drive which may be adjusted by the operator of the stamping press.

One of the characteristics of the process of extruding soap into bars and the practice of stamping short segments of the bars into the finished cakes is that the condition of the surface of the extruded bars persists into the finished cake since the pieces or segments, which generally are about one and one-half inches in diameter and three inches long, are pressed crosswise, i. e. diametrically as distinguished from endwise or axially. Thus, if the extruded bar is given a fine glassy surface texture, the finished cakes will have this same desirable surface finish. To utilize this attribute of bar extrusion to the fullest, this invention has as another of its objects to provide means by which the surface of the bar being extruded is polished to an extremely smooth glassy finish.

With the conventional plodder type methods of forming soap into a bar or "rope" as it is often referred to preparatory to the cutting and stamping of cakes, the removal of entrapped air, where a deaerated bar is being made, has always been a serious problem. The very high pressure involved in the technique of this invention simplifies this problem and, in fact, it is another object of this invention to utilize the high pressure in the extrusion nozzle to squeeze out and remove any entrapped air from the soap being extruded.

Still another object of this invention is to provide a machine of the character described which, by slight modification, can be used to extrude aerated bars as well as deaerated bars.

With the above and other objects in view, which will appear as the description proceeds, this invention resides in the unique technique substantially as hereinafter described and more particularly defined by the appended claims, it being understood that such changes in the precise embodiment of the hereinafter disclosed invention may be made as come within the scope of the claim.

The hardness of the soap and detergent material with which this invention is concerned may be of the effect of any one or more of several causes. It may be the result of the moisture content being reduced below eleven percent. It may be achieved by ultra-milling or texture refinement. It may be caused by incorporated salts such as the sodium sulfate which accompanies synthetic detergents blended with soap in the manner disclosed in the pending application of Donald E. Marshall, Serial No. 250,179, now abandoned. It may be the result of inert builders such as chalk or cellulose derivatives. All such materials and conditions of moisture or texture are often desirable from a formulation standpoint so as to get good lather and rinsing properties and still have a long lasting non-soap-dish jelly forming bar.

For a better understanding of the nature of the material with which this invention is concerned, reference may be had to the copending application of Donald E. Marshall, Serial No. 174,084, now Patent No. 2,620,511, and more particularly the Harrington viscosity measuring engine disclosed therein. Very briefly, the Harrington viscosity measuring engine consists of a pneumatic power cylinder acting through a leverage system to drive a ram through a close-fitting collar and into a cylindrical chamber containing the soap mass to be tested. For the ram to enter the cylinder the material therein, of course, must be displaced. Hence, as the ram is forced into the cylinder, the material is extruded through the clearance between the ram and its close-fitting collar.

The pertinent dimensions of an embodiment of this viscosity engine used in the development of this invention are as follows:

The power cylinder has a piston area of 28.2 square inches.

The area of the ram face is .11045 square inch.

The leverage is 6 to 1.

The clearance between the ram and its collar is .001 inch.

For every pound of pressure on the driving cylinder the pressure on the soap sample being tested is 1,538 pounds per square inch.

By measuring the time required to extrude a given amount of the sample through the .001 inch clearance and multiplying that time factor by the pressure in the pneumatic driving cylinder, an arbitrary viscosity index number is obtained.

For conventional roller milled soap such as "Lux," containing 11 percent moisture, the viscosity index number is 119 since at 7.9 p. s. i. on the driving cylinder 15 seconds are required to extrude the standard measured amount of the sample.

For a typical floating soap such as "Swan" containing 14.5 percent moisture, and containing 17 percent potash soap, the viscosity index number is 79.3, since at 6.1 p. s. i. on the driving cylinder 13 seconds are required to extrude the standard measured amount of the sample.

For an ultra milled soap having the same formulation as the "Lux" above mentioned but milled in accordance with the process disclosed in the application of Donald E. Marshall, Serial No. 129,093, now Patent No. 2,594,956 and containing 5 percent moisture, the viscosity index number is 1892 since at 22.8 p. s. i. on the driving cylinder 83 seconds are required to extrude the standard measured amount of the sample.

For an ultra milled floating soap having the same formulation as the above mentioned "Swan" and milled in accordance with the process disclosed in the said application, Serial No. 129,093, and containing a moisture of 4.5 percent, the viscosity index number is 593, since at 15.2 p. s. i. on the driving cylinder 39 seconds are required to extrude the standard measured amount of the sample.

The problem with which this invention deals is further aggravated by the thixotropic property of soap which causes a lubricating film to develop between the solidified soap and any high pressure mechanical pumping element with which it is being displaced. Hence, to obtain high hydrostatic pressures when pumping solidified soap, the pumping device must be of a tight positive design capable of developing these pressures when pumping a liquid and the seals involved must be virtually tight enough to retain liquids, even though the soap to be pumped is in a highly viscous solidified state.

This invention for the first time makes possible the amalgamation and homogenization and mechanical refinement of these high viscosity soaps and other detergent mixtures by an extrusion method. In fact, by the technique of this invention, tallow soap having a moisture content of below 1 percent has been successfully amalgamated by extrusion at pressures ranging as high as 40,000 pounds per square inch.

In general the method or process of this invention consists in first milling the soap to an ultra microcrystalline state, or substantially that, preferably by the so-called band milling technique disclosed in the aforesaid pending application, Serial No. 129,093, and thereby reducing its moisture content to below 11 percent. The soap thus prepared is then force fed in a solidified state and at a temperature not in excess of 80° F. into a receiving zone. From this receiving zone the soap is advanced in small increments through a liquid-tight sealing zone into a high pressure restricted attrition zone. In this high pressure restricted attrition zone the soap mass is subjected to intense churning and attrition to further reduce its particle size and at the same time thoroughly homogenize the same.

The temperature rise of the soap in its passage from the receiving zone, through the sealing zone and its manipulation in the attrition zone should not exceed on the order of 20° F. and definitely must not raise the temperature of the discharging soap to the reversion temperature which may be as low as 140° F. In actual practice of the invention this temperature rise has been held to as low as 10° F.

By the pressure obtaining in the restricted attrition zone the homogenized soap is forced through an elongated shaping and forming zone where it is shaped and formed into a continuous bar of the desired cross section. This shaping and forming zone is of such proportions that its line loss develops the high pressure required in the restricted attrition zone. As the bar moves through this shaping and forming zone all air that may be occluded in the material is squeezed out of and from the bar by constricting the cross sectional area of the shaping and forming zone directly downstream from an air and soap release port therein.

Consequently, the bar upon discharge from the shaping and forming zone is a thoroughly amalgamated homogeneous mass free of fissures caused by air that might have been occluded therein, so that when the bar is subsequently cut into pieces and stamped into finished cakes, the cakes will not disintegrate or crack as the result of repeated wetting and drying.

While various types of apparatus might well be employed in the practice of the method described, excellent results have been obtained with the three structures illustrated in the accompanying drawings in which:

Figure 1 is a side elevational view of a combination extruding and amalgamating machine embodying this invention, said view having portions cut away and in section;

Figure 2 is a view similar to Figure 1 but showing the machine adapted to the extrusion of aerated bars;

Figure 3 is a side elevational view of still another modified embodiment of this invention and illustrating particularly the manner in which occluded air is removed from the bar being extruded; and Figure 4 is an enlarged fragmentary sectional view of a portion of the machine shown in Figure 1 to better illustrate the high pressure attrition zone or chamber.

The apparatus illustrated in the drawings utilizes a modified specially designed helical gear pump indicated generally by the numeral 5. This pump has the customary pair of meshing gears 6—7 revolving in a casing 8 in such directions that material fed into the inlet 9 of the pump moves along the outer casing walls into a restricted attrition chamber or zone 10 defined by the faces of the gears and the side walls of the casing. A high pressure is developed in this attrition chamber or zone by the resistance to the flow of the soap through the outlet 11 of the pump and the extrusion passages to which it leads.

In order to minimize the volume of the attrition chamber or zone 10 and reduce the area of the gear faces exposed to the high pressure obtaining therein, the casing has a pair of shrouds 12 which overlie the gear faces and closely approach each other but still leave a port 13 of adequate capacity leading from the attrition zone into a discharge chamber 14.

To provide the necessary seal between the inlet 9 and the restricted high pressure attrition zone 10 the gears 6—7 are much larger in diameter than they would be in a conventional gear pump of equivalent capacity. Thus, as the gears revolve and the cavities between their teeth are filled to continuously advance the soap in small increments from the inlet 9 to the attrition zone 10 the relatively long distance which each of these small increments must travel to reach the attrition zone results in many such increments of soap being in transit at one time so that there are many seals between the inlet of the pump and the high pressure in the attrition zone. These numerous seals and the close fit between the sides of the gears and the adjacent walls of the casing provide a virtually liquid-tight seal between the inlet and the attrition zone and thus effectively seal the inlet from the high pressures obtaining in the attrition zone notwithstanding the thixotropic nature of soap gel and the synaeresis which results therefrom when soap is subjected to high pressure.

The efficiency of this type of pump is so high that operating at speeds as slow as 12 and 25 R. P. M. the discharge rate is high enough to satisfy the demands of the process. By virtue of this slow speed and the relatively long sealing zone the heat generated in the pump is held to a minimum and well below that which can be successfully dissipated by the radiation areas available, through the application of conventional cooling jackets or coolant spaces 15 which lie directly adjacent to the casing walls swept by the gear teeth and preferably extend into the shrouds 12.

Since the pump of this invention partakes of some of the characteristics of a roller mill in that some of the material inevitably remains in the roots of the teeth and thus passes through the "bite" of the revolving gears, the width of the gear faces is held to a minimum consistent with the desired capacity of the pump, to prevent shaft deflection and furthermore their shafts are much heavier than would be the case in a conventional gear pump of equivalent capacity. For purposes of illustration but not limitation the pertinent dimensions of a gear pump which may be employed in the practice of this invention are as follows:

The diameter of the gears, which are helical, is approximately 12 inches, their shafts are 6 inches in diameter and their faces are 3 inches wide.

In that embodiment of the invention illustrated in Figure 1 where two pumps are arranged to operate in tandem the first stage pump is force fed by a screw type conveyor 16 which advances the soap from the bottom of a supply hopper 17 through a tapered barrel 18 into the inlet 9. The screw 16 is driven from any suitable power source through a variable speed drive transmission 19, and as will be readily apparent since the screw develops very little pressure, the feeder is a low horsepower piece of apparatus. Its speed is thus easily regulated.

As the material is fed forwardly by the screw there is, of course, some compaction which generates heat, and to preclude an objectionable temperature rise in the material, the barrel 18 has a cooling coil 20 encircling it through which a suitable coolant is circulated.

Between the outlet of the first stage pump and the inlet of the second stage pump is a perforated plate 21. The perforations in this plate are small, on the order of 1/16 of an inch in diameter, but are relatively closely spaced. The function of this perforated plate is twofold. By the customary orifice action it augments the refinement of the material which takes place in the attrition zone 10 (of the first stage pump); and it sets up the back pressure needed to raise the pressure in this attrition zone.

The fine threads of soap which are extruded through the holes in the perforated plate 21 enter the inlet of the second stage pump which is usually driven at a speed slightly greater than the first stage pump so as to run slightly ahead of the same and thus not cause an excessive back pressure on the first stage pump. In this second stage pump the material undergoes further homogenization and amalgamation to assure that as it leaves the pump and is forced through an elongated extrusion passage 22 it will be free from incipient cracks or fissures.

The elongated extrusion passage 22 is preferably formed by a cylindrical tube or nozzle of substantial length, at least fifty to one hundred times its diameter or mean cross section. The drawing shows this extrusion tube or nozzle broken and foreshortened.

The outermost end portion of the extrusion passage is defined by a tube section 23 mounted to rotate on its axis and driven in any suitable manner as, for instance, by means of a V-belt 24 trained over a pulley 25 which is fixed to the tube. By rotating this tube section slowly the surface of the bar being extruded is calendered and polished to a fine hard glassy finish which, as explained hereinbefore, results in an equivalent finish in the completed cakes.

The entire extrusion passage should be formed of metal and its inner wall, of course, must be highly polished. Brass, stainless steel or vitreous coated steels are ideal for this purpose; and preferably it is equipped with cooling jackets (not shown).

As noted hereinbefore, the screw type feeder 16 is a low horsepower piece of apparatus. Hence, the adjustment of its speed of rotation and consequently its rate of feed is easily effected by the simple expedient of a variable speed transmission. This allows the operator at the stamping press to regulate the extrusion rate. Any suitable means of remote control may be employed for this purpose, but the reason it is possible lies in the fact that the positive displacement gear pumps can be set to operate at a speed which will produce the maximum extrusion rate. A less efficient pumping system such as the conventional worm and barrel type could not be operated at maximum speed and curtail the feed rate without having the unit overheat.

The apparatus described and illustrated in Figure 1 is intended for the extrusion of deaerated bars and partially aerated bars which do not float. If it is desired to extrude aerated bars which float, the first stage pump is eliminated and the second stage pump is operated under air-tight conditions at an extrusion pressure sufficient to integrate fine aerated powder into bars but insufficient to completely deaerate the material. The apparatus modified in this respect is illustrated in Figure 2 where the feed screw 16 feeds the material directly into the second stage pump. For the extrusion of such aerated bars it is also necessary that the powder acted upon be aerated and fed by the screw without squeezing the air therefrom.

As indicated hereinbefore, the relative speed of the first and second stage pumps is generally such that the second stage slightly overruns the first stage, but where extremely high extrusion pressures are to be developed the opposite condition may be employed, that is, the first stage pump may operate at a slightly faster discharge rate than the second stage pump so that the pressure developed by the two pumps is cumulative. In this case the perforated plate 21 is, of course, removed.

That form of the invention shown in Figure 3 is the same as that of Figure 1 except that the extrusion passage instead of being straight throughout its length and having a rotating section at its outer end, is looped as at 26 to obtain a higher back pressure while at the same time decreasing the length of the passage and the space required.

The most important feature of this modification, however, resides in its provision for the elimination of occluded air from the bar being extruded. To this end the extrusion passage 22' has a constriction 27 therein and a plurality of air release ports 28 directly upstream from the constriction. These ports are preferably all connected with an annular manifold 29 through nipples 30 equipped with clean-out plugs 31, and the manifold has a valve controlled discharge 32. Any occluded air is thus squeezed from the soap bar as it passes through the constriction 27 and this air, along with a portion of the soap, is forced out through the ports and discharged as a fluffy soap mass to be reworked.

The embodiment shown in Figure 3 also includes a pressure indicator 33 which may be of any desired type or design.

From the foregoing description taken in connection with the accompanying drawings, it will be readily apparent to those skilled in this art that this invention achieves an important result in soap making since it makes possible the extrusion and amalgamation of extremely hard soap and detergent material without raising the temperature thereof beyond an amount which can be easily and adequately dissipated by ordinary cooling coils or jackets. It will also be apparent that though the method of this invention was designed especially for the extrusion of soap and detergents generally, other materials such as chocolate and many chemicals in solid form could very well be handled by the machine.

What I claim as my invention is:

The process of amalgamating and extruding deformable solid soap having a viscosity as high as 2000 on an arbitrary viscosity scale on which the viscosity of conventional roller-milled soap measures about 100 and that of conventional floating soap about 75, without entailing an objectionable temperature rise in the material, which process comprises: force feeding the soap in its solid state into a feed chamber; rotating meshing helical gears having elongated teeeth in a close fitting chamber which opens to the feed chamber, in directions such that the pockets defined by the spaces between gear teeth continually enter the feed chamber and move from the feed chamber along the wall of the close fitting chamber to a high pressure amalgamating chamber; by the forced feeding of the soap into the feed chamber charging quantities of the soap into the pockets defined by the spaces between gear teeth; by the rotation of the gear transferring the soap in said pockets to the high pressure amalgamating chamber; by the progressive entry of the helical teeth of one gear into the helical tooth spaces of the gear meshing therewith forcibly displacing the soap from each pocket progressively from one end thereof toward the other as said pockets pass through the high pressure amalgamating chamber to thereby fill said chamber and effect amalgamation of the soap therein; by the forced progressive displacement of the soap from the pockets into the filled high pressure amalgamating chamber forcing the soap from said chamber through an extrusion passage of such proportions that the line loss thereof develops a pressure in the amalgamating chamber of at least 1000 pounds per square inch; and abstracting the heat developed in the soap during its amalgamation and extrusion to hold the temperature thereof to below 140° F.

References Cited in the file of this patent

UNITED STATES PATENTS

| | | |
|---|---|---|
| 2,011,129 | Voorhis | Aug. 13, 1935 |
| 2,082,720 | Rutishauser | June 1, 1937 |
| 2,205,328 | Wills | June 18, 1940 |
| 2,205,837 | Ravenscroft et al. | June 25, 1940 |
| 2,265,436 | Loblein | Dec. 9, 1941 |
| 2,414,097 | Garvey | Jan. 14, 1947 |
| 2,414,098 | Garvey | Jan. 14, 1947 |
| 2,462,924 | Ungar | Mar. 1, 1949 |
| 2,495,005 | Hoglin | Jan. 17, 1950 |
| 2,535,865 | Poncelet | Dec. 26, 1950 |
| 2,594,956 | Marshall | Apr. 29, 1952 |
| 2,595,455 | Heston | May 6, 1952 |
| 2,633,083 | Smith | Mar. 31, 1953 |